Patented Sept. 13, 1932

1,876,972

UNITED STATES PATENT OFFICE

MAX ALBERT KUNZ, OF MANNHEIM, KARL KOEBERLE, OF LUDWIGSHAFEN-ON-THE-RHINE, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

PRODUCTION OF MONOAMINOANTHANTHRONES AND DERIVATIVES THEREOF

No Drawing. Application filed February 19, 1929, Serial No. 341,274, and in Germany February 24, 1928.

The present invention relates to the production of monoaminoanthanthrones and compounds derived therefrom by substitution of one or both hydrogen atoms of the amino group by organic radicles.

We have found that monoaminoanthanthrones are important intermediate products for the production of new vat dyestuffs due to their high reactivity. The monoaminoanthanthrones are produced by reducing mononitroanthanthrones, obtainable for example according to the process described in our copending application Ser. No. 341,056 filed February 18, 1929, by treating anthanthrones in an organic solvent of high boiling point with strong nitric acid. The reduction may be carried out by treating mononitroanthanthrone with an alkali metal sulphide or hydrosulphite or by means of hydrazine hydrate and the like. Monoamino compounds of derivatives of anthanthrone, such as for instance halogen, alkyl, or alkoxy derivatives, can be obtained from the corresponding mononitroanthanthrones in the same manner. The replacement of one or both hydrogen atoms attached to the nitrogen atom is effected by condensation of the monoamino anthanthrones with negatively substituted organic compounds in an organic diluting medium of high boiling point, for instance nitrobenzene and its homologues or analogues such as nitronaphthalene, trichlorbenzene and the like, acid fixing agents, such as sodium acetate, potassium carbonate and the like, and condensing catalysts, for instance metals or metal compounds, such as copper, copper oxide, copper carbonate, mercuric oxide, aluminum and the like, being added, if desired. By replacing at least one hydrogen atom of the amino group of the monoaminoanthanthrone by an organic radical, vat dyestuffs are obtained, which according to their formation probably have the constitution of imides. Negatively substituted compounds which may be employed for condensation comprise aliphatic, cycloaliphatic, or aromatic or heterocyclic compounds containing at least one negative substituent, such as halogen or nitro groups, and which may be further substituted. The second hydrogen atom of the amino group may be substituted by an alkyl group. By condensation with organic acids, the monoaminoanthanthrones produce acyl compounds; with aldehydes, they produce azomethines of good vat tinctorial properties. The condensation products of monoaminoanthanthrone and aromatic acids or halides thereof are particularly valuable vat dyestuffs, for instance those containing a benzoyl radical which may be further substituted, for instance by an alkoxy group, such as a methoxy group, preferably in m-position to the carbonyl group.

The following examples will further illustrate the nature of the said invention which however is not restricted thereto. The parts are by weight.

Example 1

A suspension of 10 parts of the mononitroanthanthrone obtainable by heating anthanthrone in nitrobenzene with 96 per cent nitric acid, and preferably brought into a finely divided condition by reprecipitation from its solution in sulphuric acid, is reduced by boiling with 300 to 400 parts of water and 20 parts of sodium sulphide, in the usual manner. The resulting amino compound corresponding to the formula:

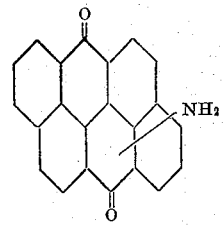

is filtered by suction and dried. It is in the form of a blue grey powder which can be recrystallized from solvents of high boiling point (in which it is very sparingly soluble) or from aqueous sulphuric acid, and then forms dark grey blue, filamentous uniform crystals. It dissolves to a violet solution in concentrated sulphuric acid and gives blue grey dyeings on cotton from a red hydrosulphite vat. Acetate silk is dyed in very fast, blue grey shades.

The aminoanthanthrone can also be obtained from the nitro compound by the aid of other reducing agents, such for example as sodium hydrosulphite or hydrazine hydrate.

*Example 2*

32 parts of monoaminoanthanthrone (prepared as in Example 1) are slowly heated to boiling with 3200 parts of nitrobenzene and 12 parts of isoterephthaloyl chloride, the resulting acylamino compound separating out as red crystals. When the reaction is completed, the product is separated by filtering by suction and treated in the usual manner. The resulting reaction product probably corresponding to the formula:

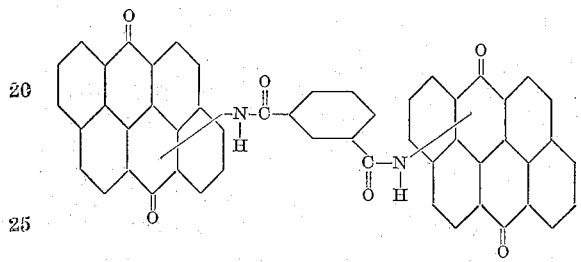

dissolves to a blue solution with a greenish tinge, in concentrated sulphuric acid, and gives very fast red dyeings on vegetable fibres from a violet vat. Saponification, for example with dilute sulphuric acid, produces reversion to the amino compound which dissolves to a violet solution in concentrated sulphuric acid.

*Example 3*

33.2 parts of monoaminoanthanthrone are boiled while stirring in 300 parts of nitrobenzene with 25 parts of m-methoxybenzoylchloride until the color of the reaction mixture has changed to red. After cooling the reaction mixture is worked up as usual. The dyestuff corresponding to the formula:

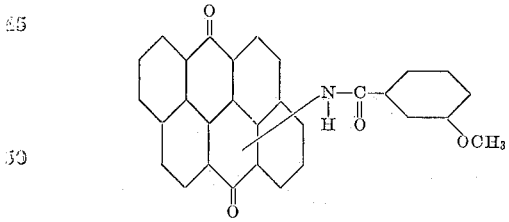

is obtained in the form of red needles dissolving to a blue green solution in concentrated sulphuric acid and dyes cotton red shades from a violet vat.

By replacing the m-methoxybenzoylchloride by the corresponding amount of benzoylchloride a dyestuff dyeing yellow red shades from a violet vat and dissolving to a blue green solution in concentrated sulphuric acid is obtained.

If chloro- or bromobenzoyl-chloride be employed instead of m-methoxybenzoyl-chloride dyestuffs of similar properties are obtained.

What we claim is:—

1. As new articles of manufacture monoaminoanthanthrones corresponding to the general formula:

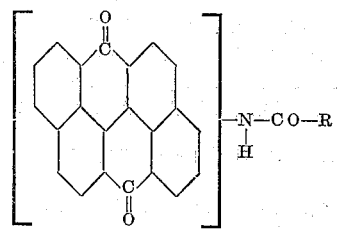

in which R stands for a benzene radical which is substituted by a methoxy group.

2. As a new article of manufacture the vat dyestuff of the formula:

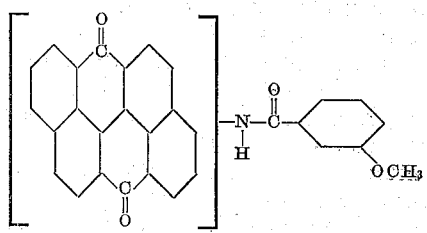

forming red needles, dissolving to a blue green solution in concentrated sulphuric acid and dyeing cotton from a violet vat red shades.

3. A process for the production of anthanthrone derivatives which comprises heating a monoaminoanthanthrone with an organic compound containing a negative substituent in an organic diluting medium of high boiling point.

4. A process for the production of anthanthrone derivatives which comprises heating a monoaminoanthanthrone with an organic compound containing a negative substituent in an organic diluting medium of high boiling point in the presence of a condensing catalyst.

5. A process for the production of anthanthrone derivatives which comprises heating a monoaminoanthanthrone with an organic compound containing a negative substituent in an organic diluting medium of high boiling point in the presence of a condensing catalyst and an acid-fixing agent.

6. A process for the production of anthanthrone derivatives which comprises heating monoaminoanthanthrone with an aromatic compound containing a negative substituent in an organic diluting medium of high boiling point.

7. A process for the production of anthanthrone derivatives which comprises heating monoaminoanthanthrone with an aromatic carboxylic acid halide in nitrobenzene.

8. A process for the production of anthanthrone derivatives which comprises heating monoaminoanthanthrone with a benzoyl chloride in nitrobenzene.

9. A process for the production of anthanthrone derivatives which comprises heating monoaminoanthanthrone with m-methoxybenzoyl chloride in nitrobenzene.

In testimony whereof we have hereunto set our hands.

MAX ALBERT KUNZ.
KARL KOEBERLE.
WERNER ZERWECK.